Apr. 3, 1923.
C. L. ANDERSON
UNIVERSAL JOINT
Filed Mar. 25, 1921
1,450,707
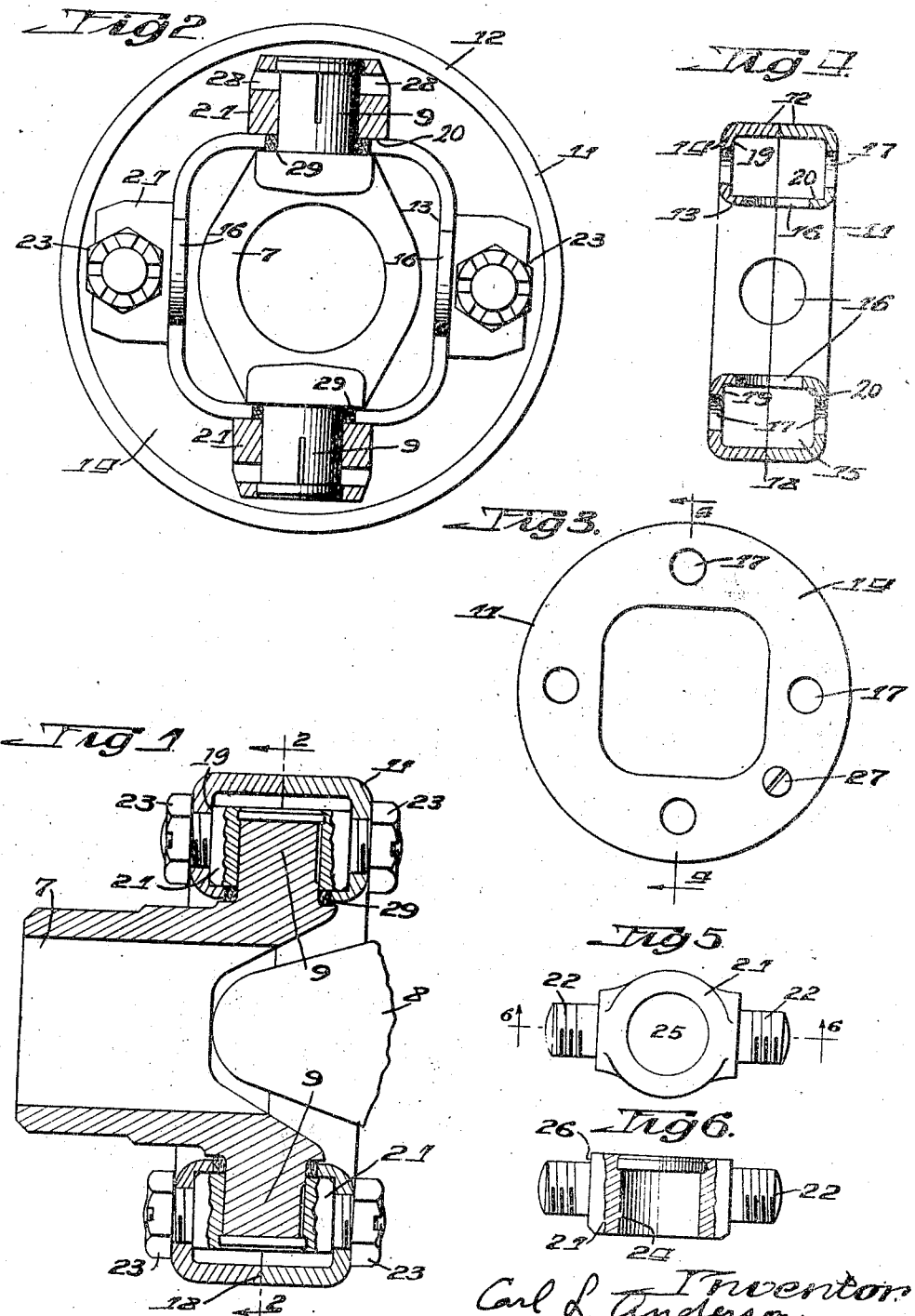
Inventor
Carl L. Anderson
By Lee J. Wilson Atty.

Patented Apr. 3, 1923.

1,450,707

UNITED STATES PATENT OFFICE.

CARL L. ANDERSON, OF ROCKFORD, ILLINOIS, ASSIGNOR OF ONE-FOURTH TO LEVIN FAUST, ONE-FOURTH TO ERIC S. EKSTROM AND ONE-FOURTH TO CARL E. SWENSON, ALL OF ROCKFORD, ILLINOIS.

UNIVERSAL JOINT.

Application filed March 25, 1921. Serial No. 455,610.

*To all whom it may concern:*

Be it known that I, CARL L. ANDERSON, a citizen of the United States, residing at Rockford, in the county of Winnebago and State of Illinois, have invented certain new and useful Improvements in Universal Joints, of which the following is a specification.

This invention pertains to universal joints of the so-called trunnion type, particularly adapted as coupling elements for the propeller shafts of motor vehicles, although equally well adapted for coupling any driving and driven members.

The primary object of the present invention is to provide a novel universal joint characterized by an oil reservoir of relatively large capacity embodied in a compact and unique construction, whereby to insure perfect lubrication of the trunnion bearing during a considerably longer period of usage than is possible with prior constructions. To this end I have aimed to utilize a transmission housing, that is, the part that couples the terminal trunnion members, as a reservoir permitting the use of liquid lubricant without danger of leakage or waste. Furthermore, I have so constructed and arranged the trunnion bearings within the reservoir as to insure at all times lubrication thereof with a thin film of oil, thereby greatly increasing the life of the universal joint and promoting general efficiency.

Another important object of my invention resides in the novel construction of the universal joint, with the view to economy in production; and I have contemplated a joint comprising but few parts, all of which may be produced by what are considered ordinary and simple machine operations. More particularly, my invention contemplates constructing the combined transmission housing and oil reservoir in several parts, each in the form of a stamping, and in clamping these together by means of parts which serve also as the bearings for the trunnions. Thus, the principal parts perform dual functions and promote economy and efficiency.

Another object is to provide a universal joint of the character described which shall be dust and dirt proof and in which the trunnion surfaces shall always be covered by their complemental bearing surfaces and lubricated by a thin film of oil.

Other objects and attendant advantages will be appreciated by those familiar with this art as the invention becomes better understood by reference to the following description when considered in connection with the accompanying drawing, in which—

Figure 1 is a longitudinal sectional view centrally through a universal joint embodying my invention;

Figure 2, a transverse sectional view taken substantially on the line 2—2 of Fig. 1, with the horizontally disposed trunnion member removed, and showing the trunnion bearings therefor and their clamping nuts in elevation;

Fig. 3, a detail end view of the transmission housing;

Fig. 4, a sectional view through said housing taken on the line 4—4 of Fig. 3;

Fig. 5, a top view of one of the trunnion bearing blocks; and

Fig. 6, a sectional view through the block taken on the line 6—6 of Fig. 5.

The terminal coupling members designated generally by characters 7 and 8 which connect to the driving and driven members, may be of any suitable or preferred construction, and at present are of the well known trunnion type, each terminating at one end in a pair of opposed coaxial trunnions 9. I propose in the present invention to provide novel means for connecting these trunnions, including efficient bearings, which shall be dust and dirt proof and thoroughly lubricated at all times.

The principal coupling part is in the form of a transmission housing designated generally by 11, which is so shaped that it also provides an oil reservoir of relatively large capacity. I have proposed to form this transmission housing of a plurality of parts, preferably of two half sections, each identical in construction. In order to promote economy in production, I prefer that these half sections shall each be in the form of a stamping, that is, a part pressed from sheet metal of the proper gauge. I have accordingly shaped each half section to provide an outer annular wall 12, and an inner four-sided wall 13 joined by an end wall 14. These sections when placed together as shown in Fig. 4, form an annular lubricant reservoir 15 of large capacity considering the outside diameter of the transmission block. Quarteringly arranged holes 16 are formed in the inside walls 13 for the reception of the trunnions 9; and in the same radial planes holes 17 are formed in the end walls 14 for the reception of the parts which clamp the transmission sections together. After these sections have been formed, the meeting surfaces 18 will be accurately machined and the surfaces 19 on the inside of the walls 14 contiguous to the holes 17, will be machined using the surfaces 18 as a gauge. The surfaces 20 will likewise be machined to provide a close joint for the inner ends of the bearing blocks which will now be described.

The transmission sections are clamped together through the agency of parts 21 disposed within the oil reservoir 15 and having diametrically opposed threaded ends 22, which extend through the opening 17 and are equipped with clamping nuts 23. These parts 21 also provide bearings for the trunnions 9. To this end, I prefer to employ a bearing construction such as described in my companion application Serial No. 455,609 in which the bearing body is provided with a through opening 24 which may be accurately machined, and an end thrust bearing cap 25 permanently secured in the outer end of the body or block 21, as explained in said application. The dimension between the shoulders 26 at the ends of the bearing block is such that when the parts are assembled, as shown in Fig. 1, and the nuts 23 are tightened, the meeting surfaces 18 of the transmission block sections will be brought together under pressure before the surfaces 19 engage the shoulders 26, so that the final clamping will insure an absolutely tight joint at 18, and at the same time rigidly secure the bearing blocks 21 in position and effect as it were, an integral one-part transmission block structure. Any suitable lock nut means may be provided for preventing displacement of the nuts 23.

It is especially desirable to use a liquid lubricant of such consistency and grade that it will flow freely as distinguished from the heavier grades of oil and grease necessitated by prior constructions, which invariably do not reach all of the bearing surfaces, with detrimental results. By reason of the present construction, I am able to use the proper grade of oil to insure most efficient lubrication. The reservoir 15 may be filled through a suitable supply opening closed by a plug 27, and the oil passes through holes 28 in each block 21 to the trunnion bearing surfaces. The joint at the inner end of each trunnion bearing is effectually sealed by a packing 29 of suitable material, such as felt.

I have found from experimentation and thorough tests that a universal joint properly constructed as disclosed herein, is absolutely dust and dirt proof and oil tight; that with oil of the proper grade and consistency a joint of this kind will transmit a given load, higher than the average for a considerably longer period than is possible with other makes of commercial universal joints, thereby assuring that a manufacturer can warrant the joint for much longer use than is permitted by the present constructions; and that this unusual durability and longevity may be attributed to the fact that the relatively large area trunnion bearings, including the end thrust bearings, are covered at all times by the complemental bearing surfaces and are dust and dirt proof and that these surfaces are continually covered with a thin film of oil, thereby reducing wear and friction to the minimum. It will also be observed that with relation to the outside diameter of the trunnion coupling members, the joint structure is especially compact and that the few parts are so designed as to be capable of production by simple machine operations at a comparatively low cost.

It is believed that the foregoing conveys a clear understanding of the objects prefaced above, and while I have illustrated and described but a single working embodiment thereof, it should be understood that various changes might be made in the construction and arrangement without departing from the spirit and scope of the invention as expressed in the appended claims; in which—

I claim:

1. A universal joint comprising trunnion-type terminal coupling members, a transmission housing formed of two annular sections shaped to jointly provide an oil reservoir of large capacity, and trunnion bearing blocks within said reservoir providing bearings for the trunnions and serving also for clamping said sections together.

2. In a trunnion-type universal joint, a transmission housing comprising a plurality of annular parts shaped to jointly provide an annular oil reservoir of relatively large capacity, and means clamping said parts together and providing bearings for the trunnions.

3. In a trunnion-type universal joint, a transmission housing formed of a plurality of annular sections providing an oil reservoir of relatively large capacity, and trunnion bearing blocks within said reservoir, having threaded ends extending through the end walls of the reservoir and equipped at the exterior thereof with nuts for clamping the reservoir sections together.

4. A universal joint comprising a pair of trunnion-type terminal coupling members, a transmission housing formed in two half sections, each U-shaped in cross section and jointly providing an annular oil reservoir, a bearing block for each trunnion disposed within said reservoir and having threaded ends extending through the end walls of the transmission sections, and nuts on said ends for clamping said sections together.

5. In a trunnion-type universal joint, a transmission housing comprising a plurality of annular parts shaped to jointly provide an annular oil reservoir of relatively large capacity and having quarteringly arranged holes through the end walls and through the inner walls of the reservoir, a bearing block for each of the trunnions which extends through one of the second mentioned holes, each bearing block having diametrically opposed threaded ends extending through the first mentioned holes, and nuts on said ends for clamping said parts together and to the bearing blocks.

6. In a trunnion-type universal joint, the combination of terminal coupling members, a combined transmission housing and oil reservoir formed of two half sections each having an annular outer wall and a four sided inner wall joined by an end wall, the inner walls having openings for the reception of the trunnion ends, and bearing blocks for the trunnion ends within the reservoir and serving for clamping the sections together.

7. In a trunnion-type universal joint, the combination of terminal coupling members, a combined transmission housing and oil reservoir formed of two half sections each having an annular outer wall and a four-sided inner wall joined by an end wall, the inner walls having openings for the reception of the trunnion ends, bearing blocks for the trunnion ends within the reservoir and serving for clamping the sections together, said bearing blocks having oil holes connecting the oil reservoir with the trunnion bearing surfaces, and an oil-tight packing at the inner end of each trunnion bearing.

8. In a trunnion-type universal joint, the combination of a transmission housing formed of a plurality of sections providing an annular oil reservoir of relatively large capacity, and parts disposed within said reservoir, each carrying bearings for the trunnions and serving to hold said sections together.

9. In a universal joint, the combination of coupling members, a sectional transmission member, trunnion connections between said members, and a bearing block for each trunnion serving for connecting the sections of the transmission member together.

10. In a universal joint, the combination of coupling members, a sectional transmission member, trunnion connections between said members, a bearing block for each trunnion serving for connecting the sections of the transmission member together, each bearing block having a through opening providing radial bearing for its trunnion, and a bearing member secured in the outer end of each bore providing a bearing surface complemental to the outer end of its trunnion for taking the end thrust of the latter.

CARL L. ANDERSON.